United States Patent
Lee et al.

(10) Patent No.: US 11,231,615 B2
(45) Date of Patent: Jan. 25, 2022

(54) BACKLIGHT UNIT AND DISPLAY DEVICE INCLUDING THE SAME

(71) Applicant: LG DISPLAY CO., LTD., Seoul (KR)

(72) Inventors: Kyuhwan Lee, Paju-si (KR); SangChul Ryu, Paju-si (KR); DongSeok Lee, Paju-si (KR); MyungJoon Park, Paju-si (KR); GwanHoon Park, Paju-si (KR); Suhun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/077,672

(22) Filed: Oct. 22, 2020

(65) Prior Publication Data
US 2021/0149251 A1  May 20, 2021

(30) Foreign Application Priority Data
Nov. 15, 2019  (KR) .................. 10-2019-0147148

(51) Int. Cl.
*G02F 1/00* (2006.01)
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133614* (2021.01)

(58) Field of Classification Search
None
See application file for complete search history.

(56) References Cited

U.S. PATENT DOCUMENTS

| 7,777,166 B2* | 8/2010 | Roberts | G09F 9/3026 |
| | | | 250/205 |
| 2004/0218390 A1* | 11/2004 | Holman | G02B 17/002 |
| | | | 362/245 |
| 2009/0180282 A1* | 7/2009 | Aylward | G02B 6/0076 |
| | | | 362/245 |
| 2011/0051043 A1 | 3/2011 | Kim et al. | |
| 2011/0164402 A1* | 7/2011 | Kang | G02F 1/133606 |
| | | | 362/97.2 |
| 2015/0077990 A1* | 3/2015 | Park | F21V 11/00 |
| | | | 362/235 |
| 2018/0023784 A1* | 1/2018 | Tamura | F21V 9/08 |
| | | | 362/235 |

(Continued)

FOREIGN PATENT DOCUMENTS

| JP | WO2012/035760 A1 | 3/2012 |
| JP | 2016-160633 A | 9/2016 |

(Continued)

*Primary Examiner* — Gerald J Sufleta, II
(74) *Attorney, Agent, or Firm* — Birch, Stewart, Kolasch & Birch, LLP

(57) ABSTRACT

Disclosed is a backlight unit and a display device including the same. The backlight unit can include a light emitting section including a plurality of light emitting devices disposed on a substrate, and a light source protection layer disposed on the plurality of light emitting devices, wherein an air gap is disposed between a top surface of the substrate and a bottom surface of the light source protection layer and in between the light emitting devices, a light conversion sheet having a plurality of light conversion patterns disposed in positions corresponding to the plurality of light emitting devices, and a phosphor film disposed on the light conversion sheet.

19 Claims, 18 Drawing Sheets

(56) References Cited

U.S. PATENT DOCUMENTS

| | | | | |
|---|---|---|---|---|
| 2018/0182940 A1* | 6/2018 | Yamamoto | ............ | H01L 33/504 |
| 2020/0049876 A1* | 2/2020 | Watanabe | ............ | G02B 6/0043 |
| 2020/0049877 A1* | 2/2020 | Watanabe | ............. | G02F 1/0107 |
| 2020/0064687 A1* | 2/2020 | Imada | ................ | G02F 1/133504 |
| 2020/0117051 A1* | 4/2020 | Yang | ................. | G02F 1/133611 |
| 2021/0063822 A1* | 3/2021 | Wang | ....................... | H01L 33/62 |
| 2021/0074693 A1* | 3/2021 | Sim | ......................... | H01L 25/13 |

FOREIGN PATENT DOCUMENTS

| | | |
|---|---|---|
| JP | 6092446 B1 | 3/2017 |
| JP | 2019-139906 A | 8/2019 |

* cited by examiner

BACKLIGHT UNIT AND DISPLAY DEVICE INCLUDING THE SAME

CROSS REFERENCE TO RELATED APPLICATION

This application claims priority to Korean Patent Application No. 10-2019-0147148, filed on Nov. 15, 2019 in the Republic of Korea, the entire contents of which are hereby expressly incorporated by reference for all purposes as if fully set forth herein into the present application.

BACKGROUND

Field

Embodiments of the present disclosure relate to a backlight unit and a display device including the same.

Description of Related Art

Along with the development of the information society, the demand for display devices for displaying images is more and more increasing in a variety of application fields. For a display device, various display devices such as e.g., liquid crystal displays (LCD), organic light emitting displays (OLED), quantum dot light emitting displays (QLED), and so on are recently being utilized.

A liquid crystal display device of various flat-panel display devices typically utilizes a Light Emitting Diode (LED), a Cold Cathode Fluorescent Lamp (CCFL), a Hot Cathode Fluorescent Lamp (HCFL) and the like, as a light source for a backlight unit. In recent years, the light-emitting diodes having excellent light efficiency and better color reproducibility are in wide use as a light source for the backlight unit of a display device.

The backlight units can be classified into an Edge-Type, a Direct-Type and so on, according to the arrangement of the light sources and the transmission mode of light. In the Direct-Type of backlight unit, among others, the light source such as an LED can be arranged on the back side of the display device.

BRIEF SUMMARY

Embodiments of the present disclosure provide a backlight unit capable of reducing the manufacturing costs, and a display device including the same.

Further, embodiments of the present disclosure provide a backlight unit capable of implementing improved image quality, and a display device including the same.

According to an aspect, provided is a backlight unit comprising a light emitting section including a plurality of light emitting devices disposed on a substrate, and a light source protection layer disposed on the plurality of light emitting devices, wherein an air gap is disposed between a top surface of the substrate and a bottom surface of the light source protection layer, a light conversion sheet having a plurality of light conversion patterns each disposed in a position corresponding to one of the plurality of light emitting devices, and a phosphor film disposed on the light conversion sheet.

According to another aspect, provided is a display device comprising a display panel and a backlight unit disposed underneath the display panel and irradiating light onto the display panel, the backlight unit comprising a light emitting section including a plurality of light emitting devices disposed on a substrate, and a light source protection layer disposed on the plurality of light emitting devices, wherein an air gap is disposed between a top surface of the substrate and a bottom surface of the light source protection layer, a light conversion sheet having a plurality of light conversion patterns disposed in positions corresponding to the plurality of light emitting devices, and a phosphor film disposed on the light conversion sheet.

According to another aspect, provided is a display device comprising a display panel and a backlight unit, the backlight unit comprising a light emitting section including a plurality of light emitting devices disposed on a substrate, and a light source protection layer disposed on the plurality of light emitting devices, wherein an air gap is disposed between a top surface of the substrate and a bottom surface of the light source protection layer, a light conversion sheet having a plurality of light conversion patterns disposed in positions corresponding to the plurality of light emitting devices, and a phosphor film disposed on the light conversion sheet.

According to the embodiments of the present disclosure, it is possible to provide a backlight unit capable of reducing the manufacturing costs, and a display device including the same.

Further, according to the embodiments of the present disclosure, it is possible to provide a backlight unit capable of implementing improved image quality, and a display device including the same.

DESCRIPTION OF THE DRAWINGS

The above and other objects, features, and advantages of the present disclosure will be more clearly understood from the following detailed description, taken in conjunction with the accompanying drawings, wherein.

DETAILED DESCRIPTION OF THE EMBODIMENTS

Figure 1:
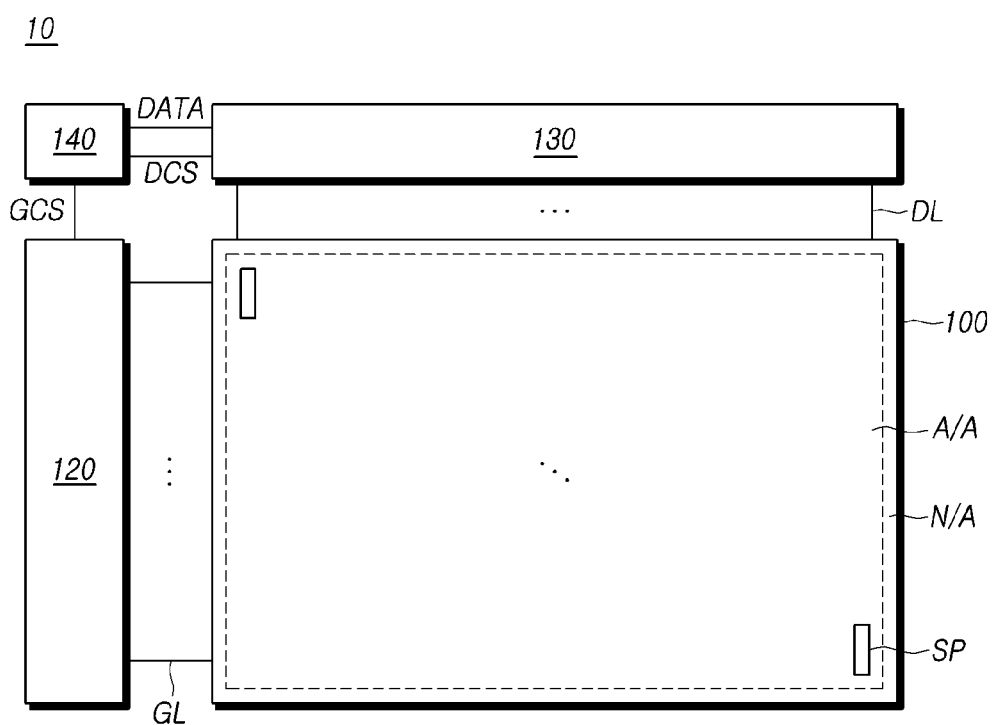
FIG. 1 is a structural diagram illustrating a display device according to the embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", and "comprising" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "overlaps," etc. a second element, it should be interpreted that, not only can the first element "be directly connected or coupled to" or "directly overlap" the second element, but a third element can also be "interposed" between the first and second elements, or the first and second elements can "be connected or coupled to", "overlap", etc. each other via a fourth element. Here, the second element can be included in at least one of two or more elements that "are connected or coupled to", "overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 is a structural diagram illustrating a display device according to the embodiments of the present disclosure. All components of the display device according to all embodiments of the present disclosure are operatively coupled and configured.

Referring now to FIG. 1, a display device 10 according to the embodiments of the present disclosure can include a display panel 100 having an active area (A/A) and a non-active area (N/A), and a gate driver 120, a data driver 130 and a controller 140 for driving the display panel 100.

On the display panel 100 can be disposed a plurality of gate lines GL and a plurality of data lines DL, and at least one subpixel SP can be disposed in an area where the gate line GL and the data line DL intersect. Further, the display panel 100 can be of a liquid crystal panel, which can include at least one pixel electrode, at least one common electrode, and at least one liquid crystal layer disposed between the at least one pixel electrode and the at least one common electrode. The liquid crystal layer can be configured to cause its molecular arrangement to change in response to voltages applied to the pixel electrode and the common electrode, so as to block or transmit the light through the liquid crystal layer to display an image.

The gate driver 120 can be configured to be controlled by the controller 140 and make a control of the driving timing of a plurality of subpixels SP by sequentially outputting scan signals to the plurality of gate lines GL arranged on the display panel 100. The gate driver 120 can include at least one gate driver integrated circuit (GDIC), and can be disposed on either one side or both sides of the display panel 100 according to a driving scheme in use.

Each gate driver integrated circuit can be connected to a bonding pad of the display panel 100 by means of Tape-Automated Bonding (TAB) or Chip-On-Glass (COG) method, or can be implemented in a Gate-In-Panel (GIP) type to be directly disposed on the display panel 100, or it can be integrated into the display panel 100 as circumstances require. Further, the gate driver integrated circuit can be implemented using a Chip-On-Film (COF) method, in which the circuit is adapted to be mounted on a film connected to the display panel 100.

The data driver 130 can be configured to receive image data from the controller 140 to convert the image data into a series of analog data voltage. The data driver 130 can be configured to output the data voltage to each data line DL in line with the timing at which the scan signals are applied through the gate line GL, so that each sub-pixel SP can represent brightness according to the image data.

The data driver 130 can include at least one source driver integrated circuit (SDIC), which can include a shift register, a latch circuit, a digital-to-analog converter, and an output buffer, although not limited thereto.

Each source driver integrated circuit can be configured to be connected to a bonding pad of the display panel 100 by Tape Automated Bonding (TAB) or Chip-On-Glass (COG) method, or can be directly disposed onto the display panel 100. Further, each source driver integrated circuit can be implemented with Chip-On-Film (COF) method, in which case each source driver integrated circuit can be mounted on a film connected to the display panel 100 and then electrically connected to the display panel 100 through wirings on the film.

The controller 140 can be configured to supply various control signals to the gate driver 120 and the data driver 130, in order to control the operation of the gate driver 120 and the data driver 130. The controller 140 can be mounted on a printed circuit board, or preferably a flexible printed circuit board, and can be electrically connected to the gate driver 120 and the data driver 130 through these printed circuit board. The controller 140 can be configured to control the gate driver 120 to adaptively output the scan signals according to the operating timing to be implemented in each frame. Further, the controller 140 can be configured to convert externally received image data in compliance with a data signal format usable in the data driver 130 and then output the converted image data DATA to the data driver 130. The controller 140 can be further configured to receive from any external source (e.g., a host system) various timing signals such as e.g., a vertical sync signal VSYNC, a horizontal sync signal HSYNC, an input data enable signal DE, and a clock signal CLK, together with the image data.

Then, the controller 140 can be configured to generate various control signals using the various timing signals received from the external source so as to supply the same to the gate driver 120 and the data driver 130. For example, in order to control the gate driver 120, the controller 140 can be typically configured to provide a variety of gate control signals GCS inclusive of e.g., a gate start pulse GSP, a gate shift clock GSC, a gate output enable signal GOE, and so on. Here, the gate start pulse GSP can be adapted to control the operation start timing of at least one gate driver integrated circuit constituting the gate driver 121.

The gate shift clock GSC can be of a clock signal commonly input to at least one gate driver integrated circuit, for controlling the shift timing of the scan signals. The gate output enable signal GOE can be adapted to specify the timing information of the at least one gate driver integrated circuit.

Furthermore, in order to control the data driver 130, the controller 140 can be configured to output various data control signals DCS inclusive of, e.g., a source start pulse SSP, a source sampling clock SSC, a source output enable signal SOE, and so on. Here, the source start pulse SSP can be adapted to control the data sampling start timing of one least one source driver integrated circuit constituting the data driver 130. The source sampling clock SSC can be of a clock signal to control the data sampling timing in each source driver integrated circuit. Further, the source output enable signal SOE can be adapted to control the output timing of the data driver 130.

Then, the display device 10 can be further configured to include a power management integrated circuit for supplying various voltages and/or currents to the display panel 100, the gate driver 120, the data driver 130 and so on, or controlling those various voltages and/or currents to be supplied thereto.

Figure 2:
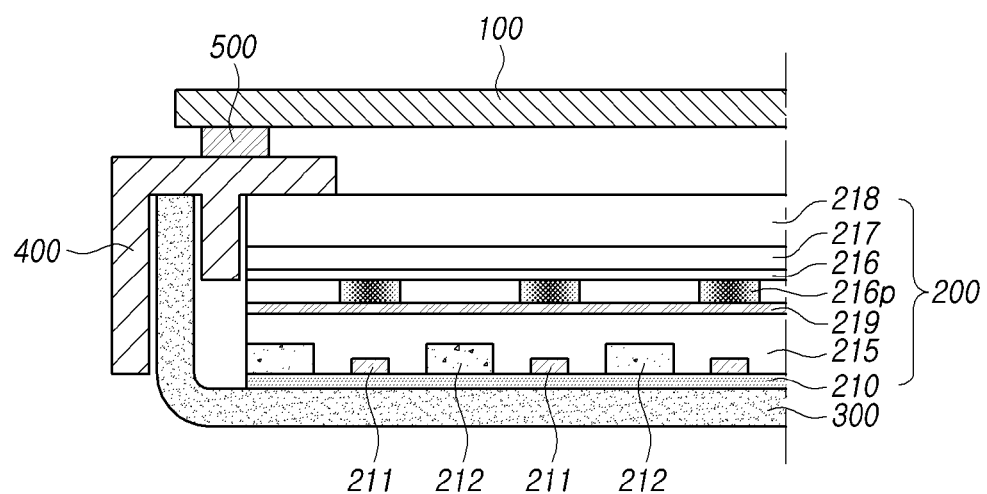
FIG. 2 is a cross-sectional view illustrating a display device according to the embodiments of the present disclosure.

FIG. 2 is a cross-sectional view illustrating a display device according to the embodiments of the present disclosure.

Referring then FIG. 2, the display device 10 according to embodiments of the present disclosure can include a display panel 100 and a backlight unit 200 disposed underneath the display panel 100 and supplying light to the display panel 100.

Some structural elements can be disposed between the backlight unit 200 and the display panel 100, and for example, the display panel 100 can be arranged on the backlight unit 200 by means of a guide panel 400, a foam pad 500, and other, but the arrangement is not limited thereto.

The backlight unit 200 can include a cover bottom 300 to accommodate optical elements and the like constituting the backlight unit 200.

The substrate 210 can be disposed on the cover bottom 300, and a plurality of light emitting devices 211 can be disposed on the substrate 210. The light emitting device 211 can be, for example, a light emitting diode (LED), or can be a small mini light emitting diode (Mini LED) or a micro-sized micro light emitting diode (μLED) and this light emitting device 211 can have a flip-chip structure. The flip-chip structure of the light emitting device 211 can be disposed in such a manner that the chip type of light emitting device 211 is mounted on the substrate 210, thereby making it possible to reduce the thickness of the backlight unit 200 and thus, provide a light source with a wider range of light irradiation angle and better light efficiency.

The light emitting device 211 can emit light in a white wavelength band, or emit light in a specific wavelength band (for example, blue wavelength band) as circumstances require. The substrate 210 can be a printed circuit board.

Further, a light source protection layer 215 can be disposed on the substrate 210 on which the plurality of light emitting devices 211 are disposed. The light source protection layer 215 can include a transparent member. The light source protection layer 215 can further include PET (polyethylene terephthalate). The light source protection layer 215 can be configured to protect the plurality of light emitting devices 211 and provide a function of diffusing light emitted from the light emitting devices 211.

A light conversion sheet 216 can be disposed on the light source protection layer 215. The light conversion sheet 216 can be configured to cause scattering, reflection, or diffraction of the light emitted from the light emitting device 211. Further, the light conversion sheet 216 can be configured to transmit some of the light irradiated from the light emitting devices 211. The light conversion sheet 216 can be of a light control sheet capable of transmitting a portion of the light. The light conversion sheet 216 can be configured to prevent hot spots from being generated in the backlight unit 200. The light conversion sheet 216 can include a plurality of light conversion patterns 216p, and the light conversion patterns 216p can be disposed to overlap each of the plurality of light emitting devices 211. For example, each of the light conversion patterns 216p can be disposed to overlap one of the light emitting devices 211, or the light conversion patterns 216p can be disposed to overlap the light emitting devices 211, respectively or correspondingly.

The light conversion pattern 216p can adjust an emitting direction of light emitted from the light emitting device 211, for example, cause to undergo scattering, reflection, or diffraction of some of the light emitted from the light emitting device 211. Further, the light conversion pattern 216p can cause transmission of some of the light emitted from the light emitting device 211. The light conversion pattern 216p can be a light control pattern capable of transmitting a portion of the light. The light emitted from the light emitting devices 211 is caused to undergo scattering, reflection, diffraction, and/or transmission by the light conversion patterns 216p, so that the light conversion sheet 216 can make the luminance of the backlight unit 200 uniform.

The light conversion pattern 216p can be disposed to overlap the light emitting device 211, and thus, the light conversion pattern 216p can be disposed in a region where the intensity of light emitted from the light emitting device 211 is strongest. Therefore, it makes it possible to reduce the luminance deviation between the region where the light emitting device 211 is disposed (i.e., a region having a larger amount of light) and the region between the light emitting devices 211 (i.e., a region having a smaller amount of light). In addition, an air gap can be formed between the light conversion patterns 216p.

The light conversion sheet 216 can include a light conversion material, and the light conversion patterns 216p of the light conversion sheet 216 can also include a light conversion material. The light conversion material can include titanium dioxide ($TiO_2$). Further, the light conversion material can be white, although not limited thereto.

Thus, the light conversion sheet 216 can reduce the luminance variation, so that it is possible to suppress occurrence of a so-called 'mura' in some peripheral area of the light emitting devices 211 in the backlight unit 200, by which the characteristics of the displayed screen get not uniform as a stained state, for example. Hence, the luminance of the light irradiated from the backlight unit 200 can be more uniform.

A phosphor film 217 can be disposed on the light conversion sheet 216. The phosphor film 217 can include a phosphor, and make a light emission by the light irradiated onto the phosphor film 217. If the light incident on the phosphor film 217 is blue light, the light passing through the phosphor film 217 can be converted into white light, by the light emitted from the phosphor.

The light conversion pattern 216p is illustrated as being arranged adjacent to the light source protection layer 215, but the arrangement is not limited thereto, and the light conversion pattern 216p can be arranged adjacent to the phosphor film 217.

In addition, a reflective film can be coated on the substrate 210. The reflective film can include a white pigment, although it is not limited thereto. The substrate 210 can be caused to undergo light reflection by the reflective film to further enhance the light efficiency of the backlight unit 200. Further, at least one reflector 212 can be disposed on the substrate 210.

The reflector 212 can be configured to cause reflection of the light diffused from the light source protection layer 215 so as to be irradiated in the direction of the phosphor film 217, thereby making the luminance of the backlight unit 200 more uniform.

Furthermore, an adhesive film 219 can be disposed between the light source protection layer 215 and the light conversion sheet 216. The adhesive film 219 can be of an optical clear adhesive (OCA) film. The adhesive film 219 serves to allow the light conversion sheet 216 to be fixed onto the light source protection layer 215.

Figure 3:
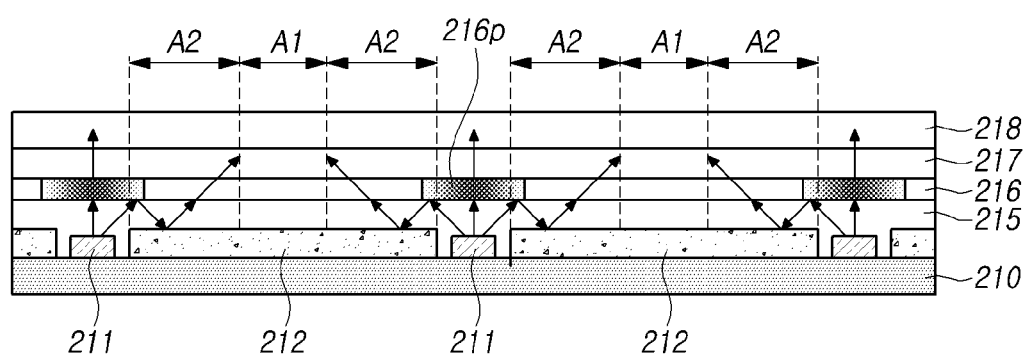
FIG. 3 is a view showing a path of light traveling in a backlight unit according to the embodiments of the present disclosure.

FIG. 3 is a view showing a path of light traveling in a backlight unit according to the embodiments of the present disclosure.

Referring to FIG. 3, some of the light emitted from the light emitting device 211 is allowed to pass through the light conversion pattern 216p of the light conversion sheet 216 and then pass through the phosphor film 217 disposed on the light conversion sheet 216. Then, the light passing through the phosphor film 217 can be uniformly irradiated onto the display panel 100 through an optical sheet 218.

Some of the light emitted from the light emitting device 211 is caused to be reflected or scattered off the light conversion pattern 216p to travel to the reflector 212 and then reflected again off the reflector 212 to pass through the phosphor film 217. The intensity of light irradiated perpendicularly to the phosphor film 217 from the light emitting device 211 becomes relatively weak, while the intensity of light irradiated to the region between the light emitting devices 211 becomes relatively stronger, so that the luminance of the light from the backlight unit 200 can be made more uniform.

However, if the number of light emitting devices 211 included in the backlight unit 200 is reduced or the area of a screen portion displaying an image in the display panel 100 increases, then the distance between the light emitting devices 211 will get wider. Thus, as the distance between the light emitting devices 211 grows farther apart, the length of the reflector 212 can be increased.

A light emitting surface of the phosphor film 217 can be divided into two sections, for example, a first area A1 and a second area A2. The first area A1 is defined to be disposed in a position farther away from the light emitting device 211 than the second area A2. Also, the first area A1 can correspond to the central portion of the reflector 212 disposed between the light emitting devices 211.

Then, when the distance between the light emitting devices 211 becomes longer, a problem often comes up that the intensity of the irradiated light gets weak in the first area A1 of the phosphor film 217 so that the luminance of the backlight unit 200 becomes uneven, even if the light is caused to undergo reflection off the reflector 212. Consequently, it will often lead to a problem that it is difficult for a designer of the backlight unit to reduce the number of light emitting devices 211 disposed on the substrate 210.

In other words, since most of the light incident on the reflector 212 is caused to be reflected in the direction of the phosphor film 217 in the second area A2, the light incident on the phosphor film 217 corresponding to the first area A1 can be very weak or absent. Therefore, a problem that the luminance becomes uneven can remain unsolved.

Figure 4:
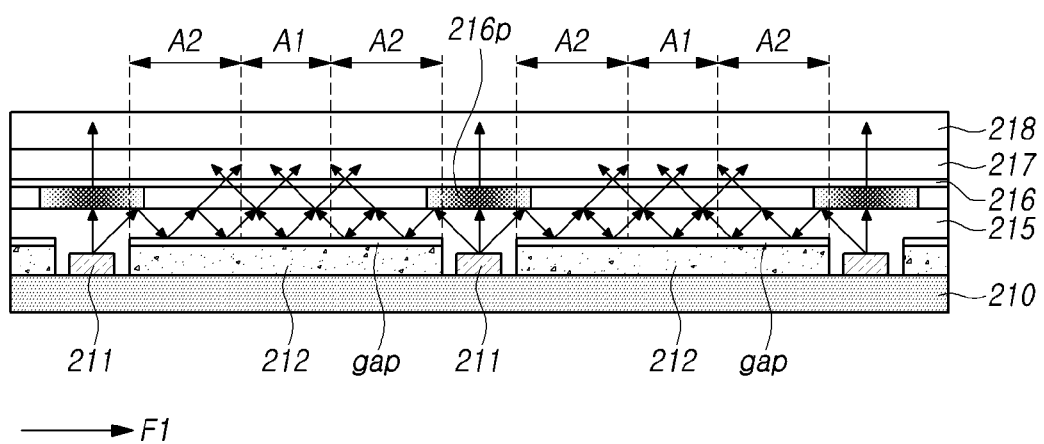
FIG. 4 is a view showing a path of light traveling in the backlight unit according to the embodiments of the present disclosure.

FIG. 4 is a view showing a path through which light travels in the backlight unit according to the embodiments of the present disclosure.

Referring now to FIG. 4, some of the light emitted from the light emitting device 211 can pass through the light conversion pattern 216p of the light conversion sheet 216 and then pass through the phosphor film 217 disposed on the light conversion sheet 216. Then, some of the light emitted from the light emitting device 211 can be reflected or scattered in the light conversion pattern 216p, and further travel to pass through the phosphor film 217 after being again reflected off the reflector 212.

Hence, the intensity of light irradiated perpendicularly to the phosphor film 217 in the light emitting device 211 becomes relatively weak, while the intensity of light irradiated to the region between the light emitting devices 211 gets relatively strong compared to the light irradiated vertically to the phosphor film 217, so that the luminance of the backlight unit 200 can become more uniform.

According to the embodiments of the present disclosure, an air gap can be disposed between a top surface of the reflector 212 and the light source protection layer 215. The light irradiated to the reflector 212 can be reflected by the air gap to proceed in the direction of the phosphor film 217 again. At the boundary between the light source protection layer 215 and the light conversion sheet 216, the light is caused to be total-reflected. Further, the light conversion sheet 216 can be arranged in such a way that a portion where no light conversion pattern 216p is disposed thereon is spaced apart from the light source protection layer 215, due to existence of the light conversion pattern 216p, and the air gap is formed in the spaced apart portion. Accordingly, the boundary between the light source protection layer 215 and the light conversion sheet 216 can be a boundary between the light source protection layer 215 and the air gap. Further, due to such a total reflection, a distance in which the light travels in a first direction F1 can be further increased.

When the distance of travelling in the first direction F1 of the light irradiated from the light emitting device 211 increases, the light can be irradiated onto the first area A1 of the phosphor film 217, so that the aforementioned problem of uneven luminance in the backlight unit 200 can be effectively solved. Therefore, even if the distance between the light emitting devices 211 gets longer, it will be possible to prevent the uneven luminance from being generated in the backlight unit 200, so that the number of light emitting devices 211 disposed on the substrate 210 can be reduced and thus, the manufacturing cost of the display device 10 can be greatly reduced.

Figure 5A:
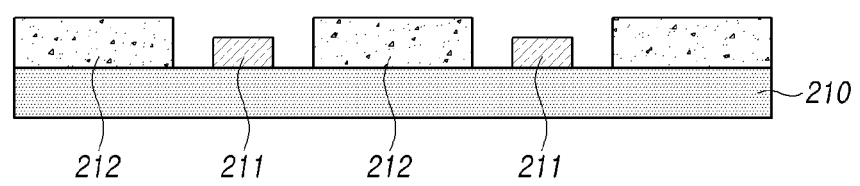
FIGS. 5A, 5B and 5C are schematic views illustrating a method of forming an air gap in a backlight unit according to the embodiments of the present disclosure.
Figure 5B:
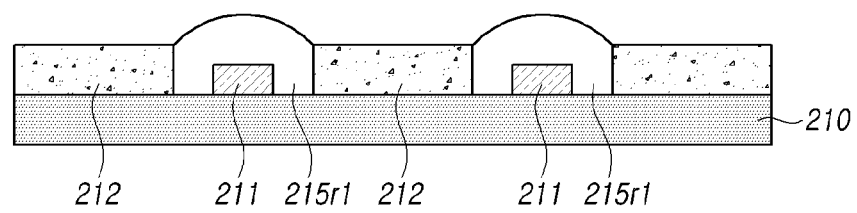
Figure 5C:
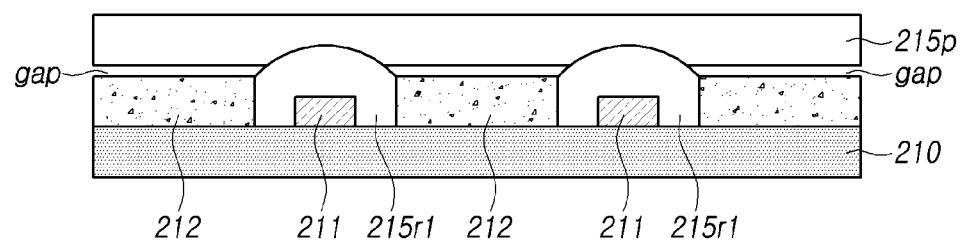

FIGS. 5A, 5B and 5C are schematic views illustrating a method of forming the air gap in the backlight unit according to the embodiments of the present disclosure.

Figure 12:
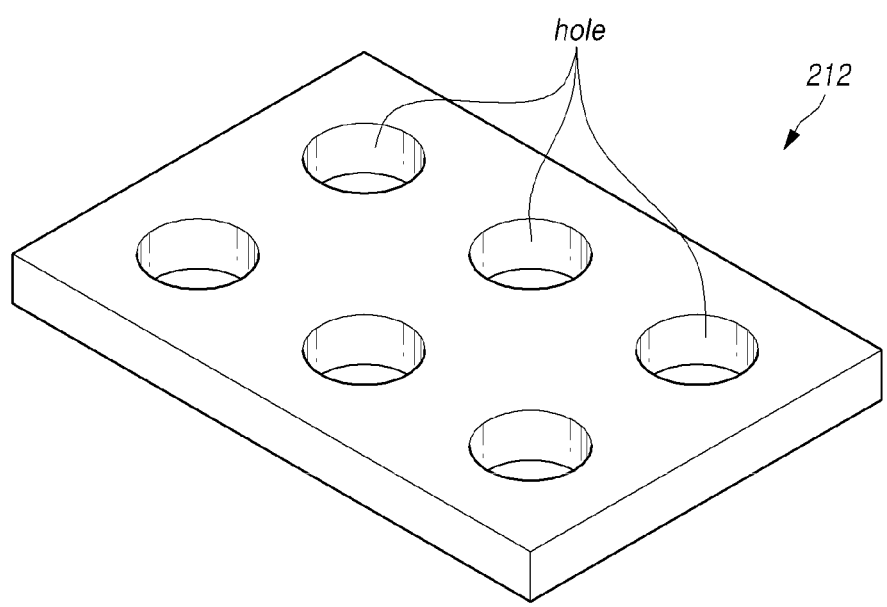
FIG. 12 is a perspective view illustrating a reflector adopted in a backlight unit according to the embodiments of the present disclosure.

As shown in FIG. 5A, at least one light emitting device 211 and at least one reflector 212 can be disposed on the substrate 210. The reflector 212 can include a plurality of holes, as shown in FIG. 12, and the reflector 212 can be disposed on the substrate 210 in such a manner that the light emitting device 211 can be disposed in each hole.

Then, as shown in FIG. 5B, a first resin layer 215*r*1 can be disposed in the hole. The top surface of the first resin layer 215*r*1 can be at a higher position than the top surface of the reflector 212. Therefore, the first resin layer 215*r*1 can be formed to protrude from the reflector 212. In addition, the first resin layer 215*r*1 can include a transparent resin.

Further, a transparent member (or a transparent film) 215*p* can be disposed as shown in FIG. 5C. The transparent member 215*p* can be made of a plastic film. The first resin layer 215*r*1 and the transparent member 215*p* can form the light source protection layer 215. The transparent member 215*p* can be made of PET (polyethylene terephthalate), although it is not limited thereto. Here, although it is illustrated that there is a boundary between the first resin layer 215*r*1 and the transparent member 215*p*, the present disclosure is not limited thereto, and the first resin layer 215*r*1 and the transparent member 215*p* can be formed of a transparent material so that its boundary does not appear visually. In addition, the first resin layer 215*r*1 and the transparent member 215*p* can have the same density.

Since the first resin layer 215*r*1 is formed to protrude from the top surface of the reflector 212, the top surface of the first resin layer 215*r*1 is higher than the top surface of the reflector 212, so the first resin layer 215*r*1 can be configured to support the transparent member 215*p*.

Accordingly, the first resin layer 215*r*1 can be in close contact with the transparent member 215*p* in a position overlapping the light emitting device 211.

The first resin layer 215*r*1 and the transparent member 215*p* can be included in the light source protection layer 215.

On the other hand, a predetermined gap can be formed between the top surface of the reflector 212 and the lower surface of the transparent member 215*p*, and the predetermined gap can be an air gap. Thus, the air gap can be disposed between the top surface of the reflector 212 and the lower surface of the transparent member 215*p*. Since the light source protection layer 215 includes the first resin layer 215*r*1 and the transparent member 215*p*, the air gap can be disposed between the top surface of the reflector 212 and the lower surface of the light source protection layer 215. Further, the light source protection layer 215 can be attached to the light emitting device 211 by means of the first resin layer 215*r*1.

Figure 6A:
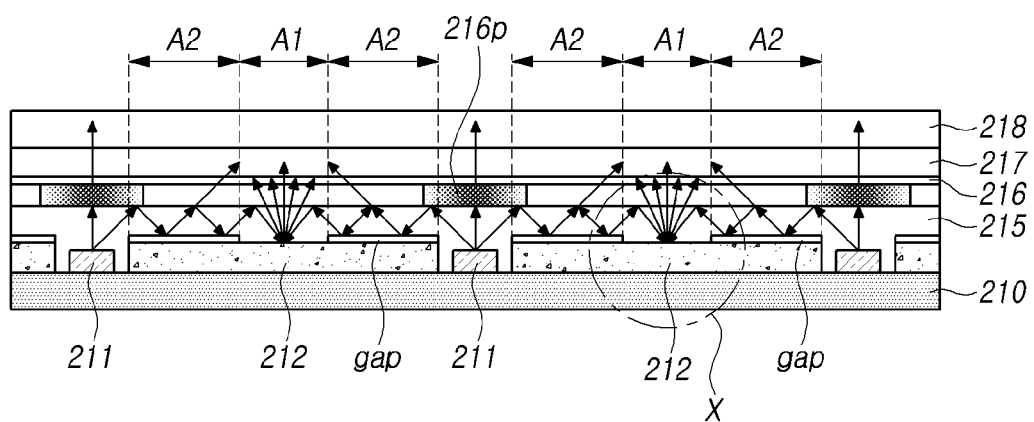
FIG. 6A is a cross-sectional view schematically showing a backlight unit according to the embodiments of the present disclosure.
Figure 6B:
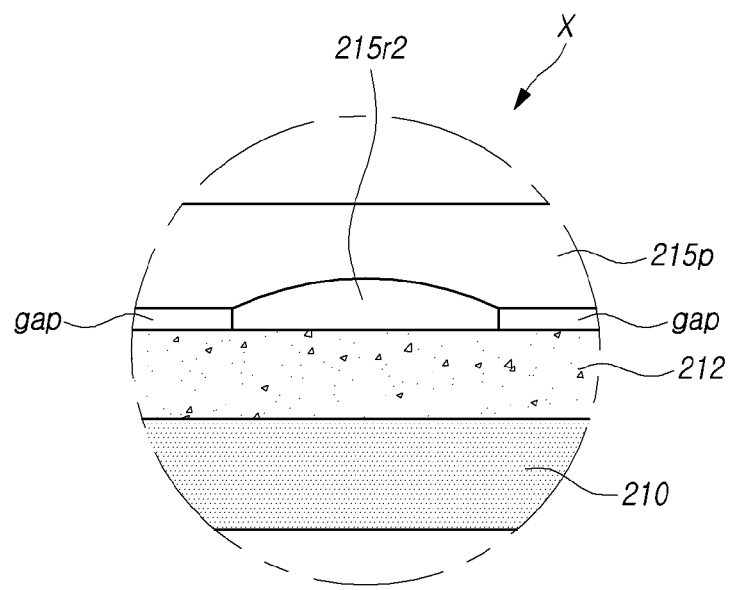
FIG. 6B is an enlarged view of a portion X of the backlight unit as shown in FIG. 6A.

FIG. 6A is a cross-sectional view schematically showing the backlight unit according to the embodiments of the present disclosure, and FIG. 6B is an enlarged view of some portion of the backlight unit as shown in FIG. 6A.

Referring now to FIGS. 6A and 6B, the arrangement can be made so that no air gap is disposed on the reflector 212 in a position corresponding to the first area A1 of the phosphor film 217. Hence, no total reflection is generated in the central portion of the reflector 212 disposed between the light emitting devices 211 so that the reflector 212 can cause reflection of the light toward the display panel 100 (or towards the phosphor film 217).

Occurrence of such a total reflection can cause a problem that irradiation of the light to the phosphor film 217 does not work well, but when total reflection is not generated in the central portion of the reflector 212, the light can be irradiated to the first area A1 of the phosphor film 217, thereby preventing the unevenness of the luminance effectively. A second resin layer 215*r*2 can be formed on the central portion X of the reflector 212 and a transparent member 215*p* can be disposed on the second resin layer 215*r*2. The second resin layer 215*r*2 can contact the transparent member 215*p* to support the transparent member 215*p*. Therefore, in the region where the second resin layer 215*r*2 is disposed on the reflector 212, the second resin layer 215*r*2 and the transparent member 215*p* are in contact with each other, so that no air gap is formed in an area where the second resin layer 215*r*2 is disposed on the reflector 212.

Although it is illustrated that a boundary exists between the second resin layer 215*r*2 and the transparent member 215*p*, the arrangement is not limited thereto, and the second resin layer 215*r*2 and the transparent member 215*p* can include a transparent material, so that such a boundary does not visually appear between the second resin layer 215*r*2 and the transparent member 215*p*. In addition, the second resin layer 215*r*2 and the transparent member 215*p* can have the same density.

Figure 7:
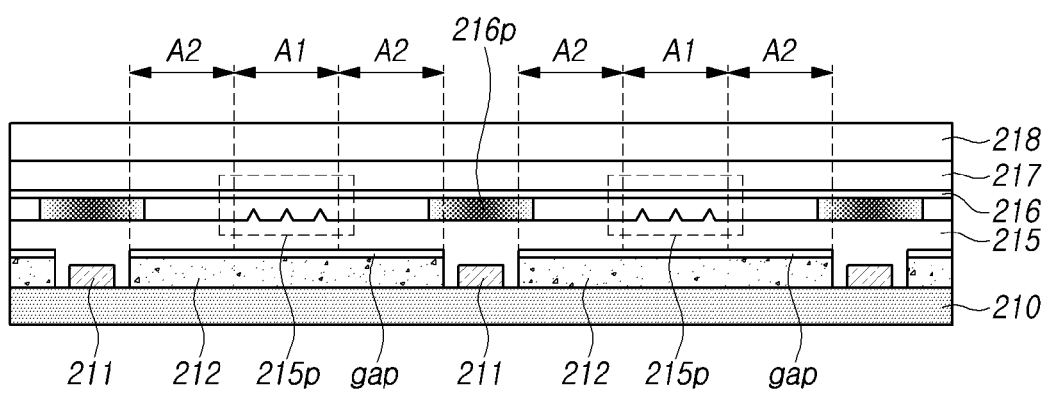
FIGS. 7 and 8 are cross-sectional views showing a backlight unit according to the embodiment of the present disclosure.
Figure 8:
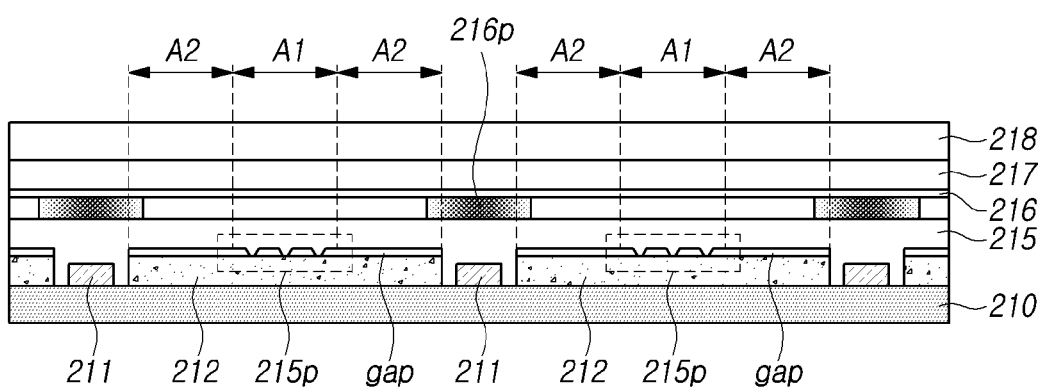
Figure 9:
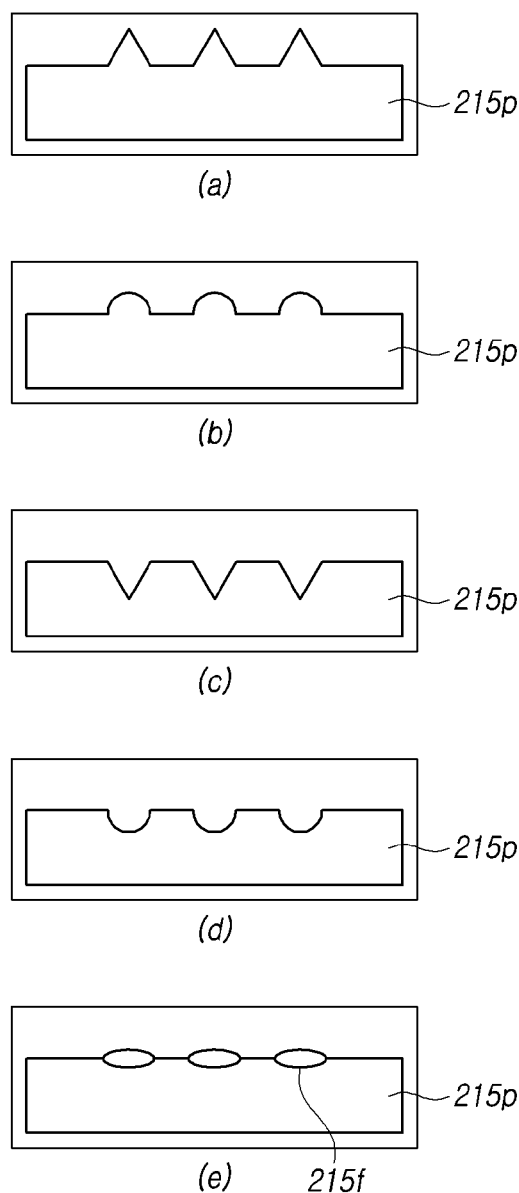
FIG. 9 is a set of cross-sectional views schematically illustrating various shapes of the patterns arranged on a transparent film included in the backlight unit.

FIGS. 7 and 8 are cross-sectional views showing a backlight unit according to the embodiment of the present disclosure, and FIG. 9 is a set of cross-sectional views schematically illustrating various shapes of patterns arranged on a transparent film included in the backlight unit.

As shown in FIG. 7, the arrangement can be made so that no total reflection occurs in a position corresponding to the first area A1 of the phosphor film 217, by forming a pattern including unevenness on the upper surface of the transparent member 215*p*. Further, as shown in FIG. 8, such a pattern including unevenness can be formed on the lower surface of the light source protection layer to prevent total reflection from occurring in a position corresponding to the first area A1 of the phosphor film 217.

As illustrated in exemplary patterns (a) to (d) of FIG. 9, the patterns disposed on the upper or lower surface of the transparent member 215*p* can be formed in an intaglio or embossed shape on the transparent member 215*p*, and the cross-sectional shape of the patterns can be advantageously semicircular or triangular, although the shape of the patterns is not limited thereto. Further, a bead layer 215*f* can be printed on the transparent member 215*p*, as shown in (e) of FIG. 9, and the bead layer 215*f* can include a plurality of beads. The beads included in the bead layer 215*f* can include at least one selected from the group consisting of polymethyl methacrylate (PMMA), polybutyl methacrylate (PBMA), polystyrene, and silicon. The plurality of beads can include a first bead and a second bead having different refractive indices from each other. The refractive index of the first bead and the second bead can be between 1.45 and 1.55. In addition, the average diameter of the beads can range from 1 to 15 µm. The shape of the beads can be circular or oval, but the size and shape of the beads 215*f* are not limited thereto.

The beads can be disposed on the transparent member 215*p*, and an adhesive material such as resin can be disposed underneath the beads so that the beads can be fixed on the transparent member 215*p*. Thus, these beads can serve to cause diffusion of the light passing through the transparent member 215p disposed underneath the beads, so as to prevent a total reflection from being generated on the transparent member 215p.

Further, titanium dioxide (TiO$_2$) can be printed on the transparent member 215p in a circular or oval shape or other form. Therefore, it is possible to prevent a total reflection from being generated on the transparent member 215p by titanium dioxide (TiO$_2$).

Figure 10:
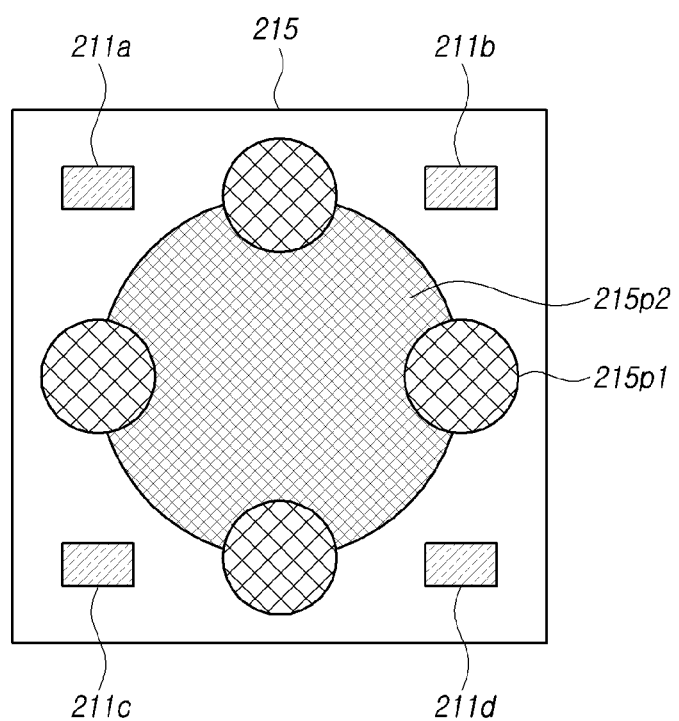
FIG. 10 is a plan view showing a part of a light source protection layer on which a certain pattern is formed.

FIG. 10 is a plan view showing a part of a light source protection layer on which a certain pattern is formed.

Referring to FIG. 10, the light source protection layer 215 can be transparent, so that the light emitting devices 211a to 211d disposed underneath the light source protection layer 215 can be seen from the outside. These four light emitting devices 211a to 211d can be disposed at a certain distance from the bottom of the light source protection layer 215.

The above pattern can include a first pattern 215p1 and a second pattern 215p2, and the first pattern 215p1 can be arranged between a first light emitting device 211a and a second light emitting device 211b, and between a third light emitting device 211c and a fourth light emitting device 211d, between the first light emitting device 211a and the third light emitting device 211c, and between the second light emitting device 211b and the fourth light emitting device 211d. Also, the first pattern 215p1 can be disposed between the first light emitting device 211a and the fourth light emitting device 211d. Further, the second pattern 215p2 can be disposed within a virtual rectangle of which vertexes correspond to the respective positions of the four light emitting devices 211a to 211d. The first pattern 215p1 and the second pattern 215p2 can have differences in height and area of the unevenness. In other words, the height and area of the unevenness of the first pattern 215p1 can be smaller than the height and area of the unevenness of the second pattern 215p2, although the shape of the unevenness is not limited thereto. Further, the second pattern 215p2 can have a larger number of patterns per unit area in the middle portion (a portion far from the light emitting device), while it can have a smaller number of patterns per unit area as it goes further towards the outer portion (a portion closer to the light emitting device).

Here, although the first pattern 215p1 and the second pattern 215p2 are both formed on the light source protection layer 215, the arrangement as disclosed is not limited thereto, and either the first pattern 215p1 or the second pattern 215p2 can be formed on the light source protection layer 215.

Figure 11:
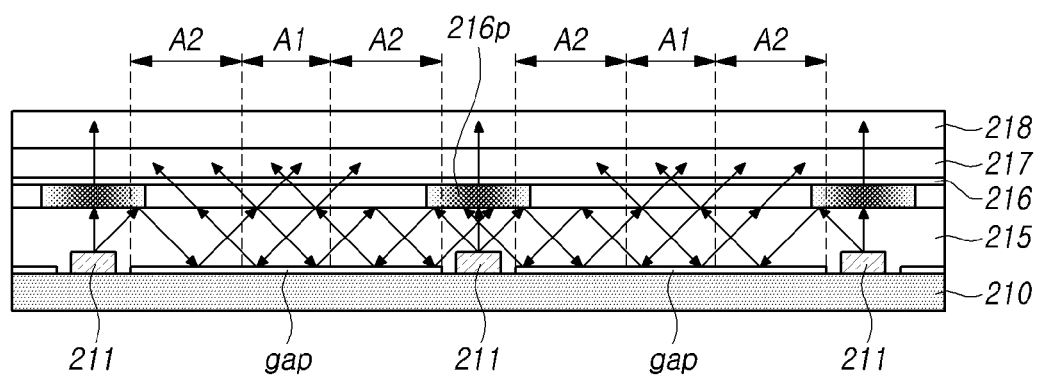
FIG. 11 is a cross-sectional view illustrating a backlight unit according to the embodiments of the present disclosure.

FIG. 11 is a cross-sectional view illustrating the backlight unit according to the embodiments of the present disclosure.

Referring to FIG. 11, the light emitting devices 211 can be disposed on the substrate 210. Further, an air gap can be disposed between the light emitting devices 211 on the substrate 210. For example, the reflector 212 is not disposed on the substrate 210, and thus, the thickness of the light source protection layer 215 can become thicker than the thickness of the light source protection layer 215 as shown in FIGS. 4, 6A, 7 and 8.

In the backlight unit 200, total reflection can be caused in the air gap and the boundary between the light source protection layer 215 and the light conversion sheet 216, by the air gap disposed on the substrate. Further, when the thickness of the light source protection layer 215 is relatively thick, the light can be diffused more widely within the light source protection layer 215.

The formation of such an air gap on the substrate 210 can form a first resin layer covering the light emitting device 211 disposed on the substrate 210, and a transparent member can be disposed on the first resin layer. The transparent member can be in close contact with the resin layer in the upper portion of the first resin layer, but the portion in which no resin layer is formed can have a certain distance from the substrate 210 as the first resin layer is formed to support the transparent member. Hence, an air gap can be formed between the lower surface of the transparent member and the upper surface of the substrate 210. The transparent member and the first resin layer can be included in the light source protection layer 215. Advantageously, the pattern shown in FIG. 9 can be formed on the transparent member, and a second resin layer can be disposed between the light emitting devices 211. Then, the second resin layer can be brought into contact with the transparent member, so that no air gap is formed between the second resin layer and the light emitting devices 211. The first resin layer, the second resin layer and the transparent member can have the same density, although they are not limited thereto.

FIG. 12 is a perspective view illustrating the reflector adopted in the backlight unit according to the embodiments of the present disclosure.

Referring to FIG. 12, the reflector 212 can be disposed corresponding to the substrate 210. The reflector 212 can include a plurality of holes. The light emitting device 211 can be disposed in the center of the hole. Here, although the shape of the hole is shown as being circular, it is not limited thereto.

Figure 13:
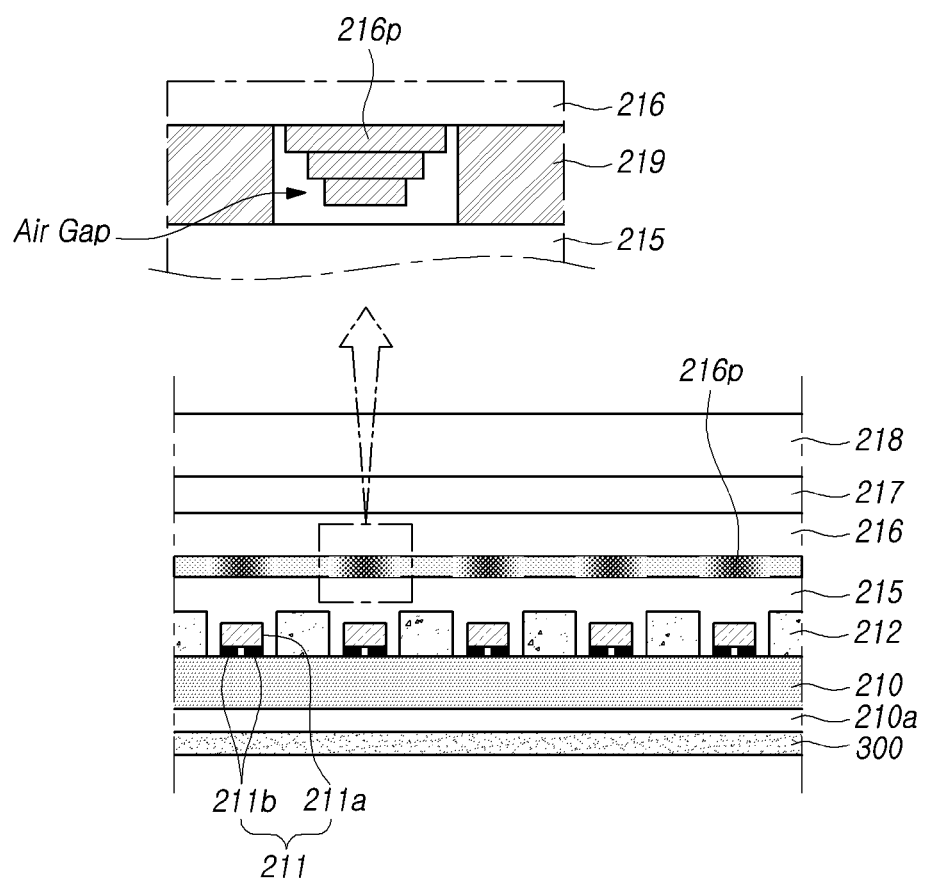
FIG. 13 is a view schematically showing an example of the structure of a backlight unit according to the embodiments of the present disclosure.

FIG. 13 schematically shows a first embodiment of the structure of the backlight unit according to the embodiments of the present disclosure.

Referring to FIG. 13, the substrate 210 can be disposed on a cover bottom 300, and the substrate 210 can be fixed onto the cover bottom 300 by means of an adhesive tape 210a disposed between the cover bottom 300 and the substrate 210.

A plurality of light emitting devices 211 can be disposed on the substrate 210, and at least one reflector 212 can be disposed in at least part of an area other than the area in which the light emitting devices 211 are disposed.

Here, the light emitting device 211 can be, for example, a light emitting diode (LED), which can further include a light emitting element 211a having an n-type semiconductor layer, an activation layer and a p-type semiconductor layer, and an electrode 211b. A light source protection layer 215 can be disposed on the plurality of light emitting devices 211 and the reflectors 212. A light conversion sheet 216 having a light conversion pattern 216p thereon can be disposed in a position corresponding to the light emitting device 211 on the light source protection layer 215. Further, on the light conversion sheet 216 can be disposed a phosphor film 217, an optical sheet 218 and others.

The light conversion pattern 216p disposed on the bottom surface of the light conversion sheet 216 can be implemented by allowing a certain material with specific light conversion characteristics to be printed on the light conversion sheet 216, preferably, for example, by means of printing a certain pattern of ink inclusive of TiO$_2$ on the light conversion sheet 216. Further, the light conversion pattern 216p disposed on the bottom surface of the light conversion sheet 216 can be formed either of one layer or in a multi-layer structure. That is to say, as shown in FIG. 13, the light conversion pattern 216p disposed on the lower surface of the light conversion sheet 216 can be formed of at least three layers. This light conversion pattern 216p can be implemented through a method of printing the light conversion material on the light conversion sheet 216 three times, and the area of the printed light conversion material can be gradually narrowed. Furthermore, the light conversion pattern 216p can be disposed on the light emitting device 211 by inverting the light conversion sheet 216 on which the light conversion pattern 216p is disposed and then placing it on the light source protection layer 215.

Therefore, the area of the light conversion pattern 216p can be gradually narrowed downward from the bottom of the light conversion sheet 216, and the thickness in the central portion of the light conversion pattern 216p can be greater than the thickness in its outer portion.

In other words, since the intensity of light output in the vertical direction from the light emitting device 211 is the largest, the central portion of the light conversion pattern 216p can be made thicker, although it is not limited thereto.

As described above, the arrangement of the light conversion pattern 216p on the light emitting device 211 allows at least part of the light output in the vertical direction from the light emitting device 211 to be blocked so as to prevent any hot spot from appearing in a region where the light emitting device 211 is disposed. The light conversion sheet 216 on which the light conversion pattern 216p is disposed can be attached to the light source protection layer 215 by an adhesive film 219. At this juncture, the adhesive film 219 can be disposed on at least some of an area except for the area in which the light conversion pattern 216p is disposed on the lower surface of the light conversion sheet 216.

Therefore, the adhesive film 219 may not be disposed in the area where the light conversion pattern 216p is disposed, and an air gap can exist between the light conversion pattern 216p and the light source protection layer 215. Further, a side portion of the light conversion pattern 216p and the adhesive film 219 can be disposed to be spaced apart from each other. As the air gap exists between the light conversion pattern 216p and the light source protection layer 215, the light output in the lateral direction of the light conversion pattern 216p can be caused to undergo reflection by the air gap. That is to say, the light output in the lateral direction of the light conversion pattern 216p can be emitted at a large refraction angle or reflected off the air layer, by the air layer having a low refractive index. Further, the light reflected off the air layer is again reflected by the reflector 212 and then output, thereby increasing the light efficiency while assisting the light conversion function of the light conversion pattern 216p.

As described above, it is possible to increase the light efficiency of the backlight unit while preventing occurrence of hot spots through the structure in which the light conversion elements 211p and the air gaps are disposed at the positions corresponding to the light emitting devices 211. Further, the light conversion patterns 216p disposed underneath the light conversion sheet 216 can be arranged in a different structure according to their arranged positions.

Figure 14A:
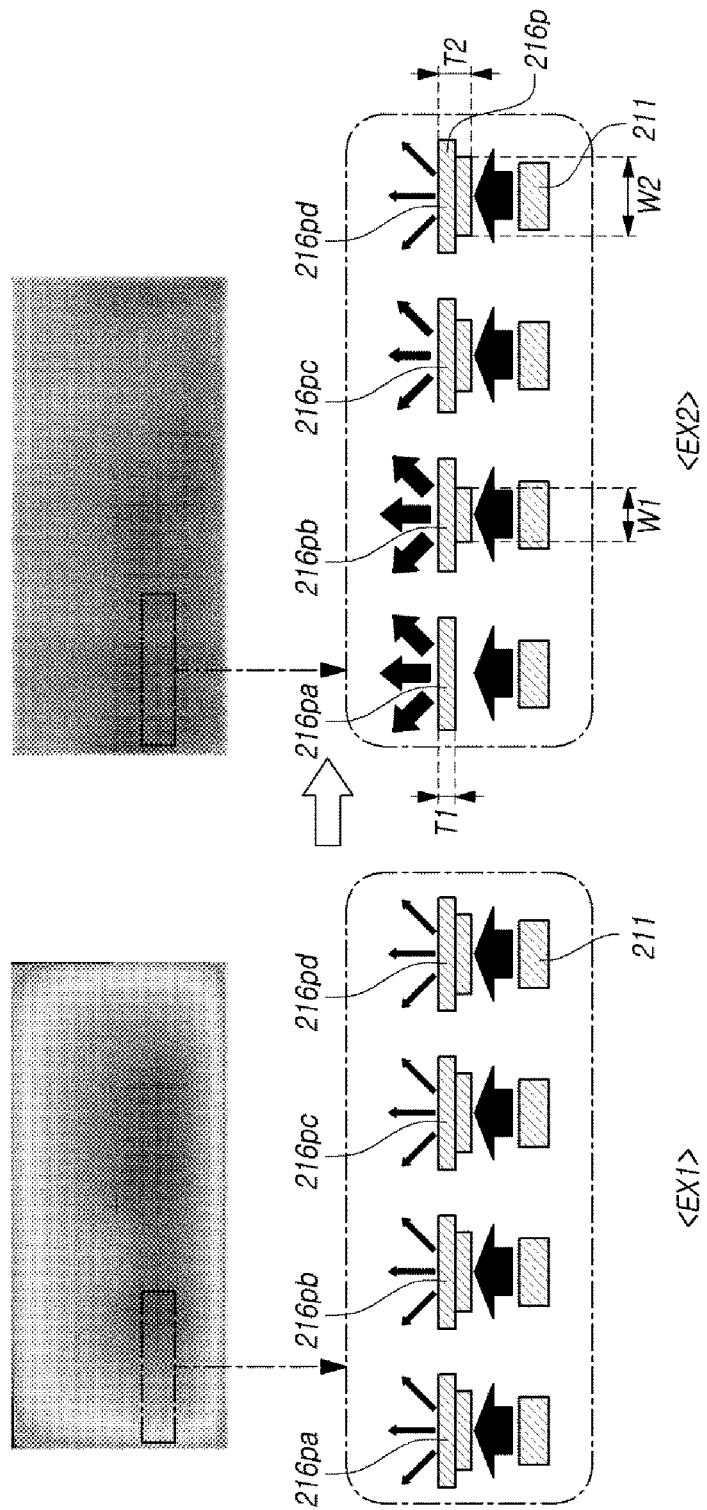
FIGS. 14A and 14B are views illustrating an example of the structure according to the position of the light conversion patterns included in the backlight unit as shown in FIG. 13.
Figure 14B:
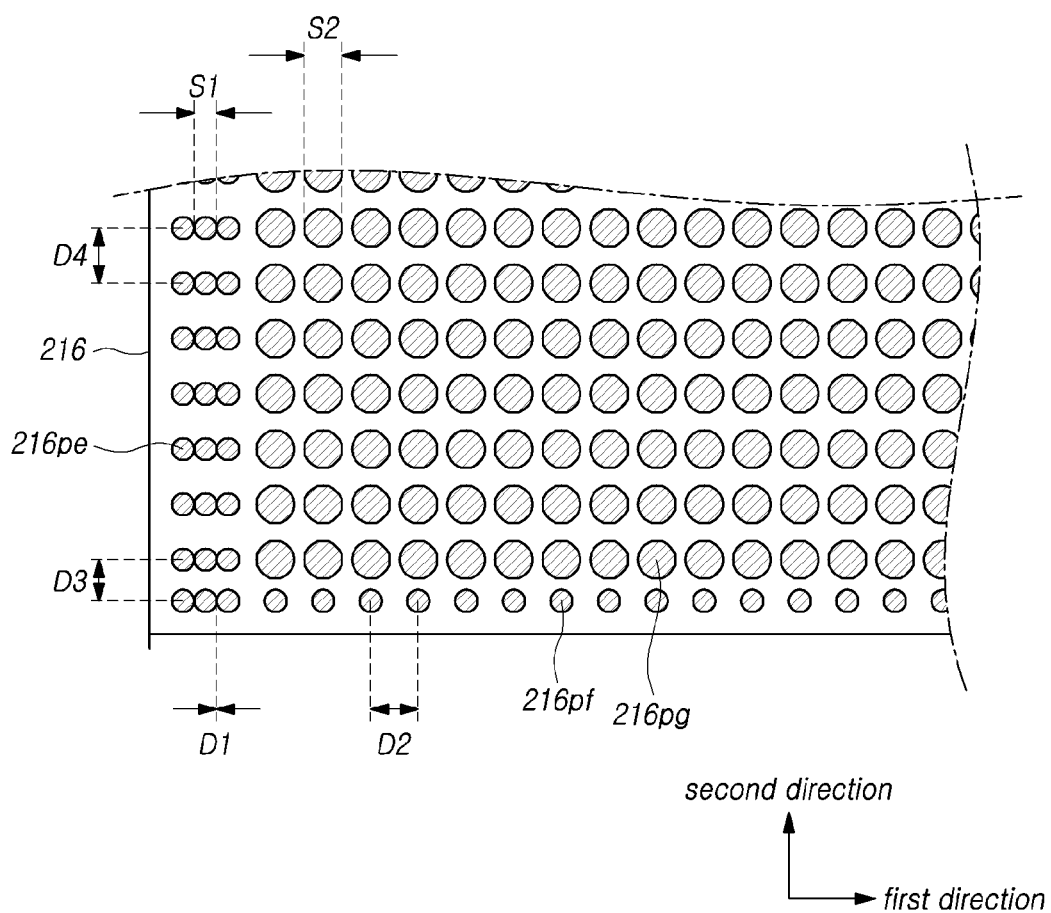

FIGS. 14A and 14B illustrate examples of the light emitting structures according to the positions of the light conversion patterns included in the backlight unit as shown in FIG. 13.

Referring first to FIG. 14A, illustrating examples of the luminance appearing through the backlight unit 200 according to the structure of the light conversion patterns 216p, the example <EX1> represents the luminance measured when the light conversion patterns 216p are arranged in a certain regular pattern of structure, whereas the example <EX2> represents the luminance measured when the light conversion patterns 216p are arranged in a different pattern of structure according to the positions where the light conversion patterns 216p are arranged.

As seen in the example <EX1> of FIG. 14A, the luminance in the outer area of the backlight unit 200 can appear lower than that of the central area thereof, when the light conversion pattern 216pa disposed in the outer area of the backlight unit 200 and the light conversion pattern 216pd disposed in the central area thereof are substantially the same as each other in their structures.

In other words, since the outer area of the backlight unit 200 has a relatively small number of the light emitting devices 211 supplying light to the corresponding outer area, the outer area of the backlight unit 200 can have lower quality of luminance compared to the central area of the backlight unit 200 in case where the light conversion patterns 216p having the same level of light conversion characteristics are arranged thereon.

Therefore, as seen in the example <EX2> of FIG. 14A, by having the light conversion pattern 216pa in the outer area of the backlight unit 200 arranged in a different structure from the light conversion pattern 216pa in the central area thereof, it is possible to prevent the luminance in the outer area of the backlight unit 200 from deteriorating and thus, make the overall luminance on the display device more uniform.

As an example, the light conversion patterns 216p can be arranged so that the thickness T1 of the light conversion pattern 216pa disposed in the outer area of the backlight unit 200 is smaller than the thickness T2 of the light conversion pattern 216pd disposed in the central area thereof.

Alternatively, the light conversion pattern 216p can be arranged so that the area W1 of the thickest portion in the light conversion pattern 216pb disposed adjacent to the outer area of the backlight unit 200 is smaller than the area W2 of the thickest portion in the light conversion pattern 216pa disposed in the central area. In other words, the light conversion patterns 216p can be arranged so that the portion with higher blocking characteristics in the light conversion patterns 216pa and 216pb disposed in the outer area of the backlight unit 200 or an area adjacent to the outer area has a smaller area.

Further, the light conversion patterns 216p can be arranged so that as it goes further from the center area to the outer area of the backlight unit 200, the thickness of the light conversion pattern 216p gradually decreases or the area of the thickest portion in the light conversion pattern 216p gradually decreases. Thus, as apparent from the foregoing, the portion with higher blocking characteristics in the light conversion patterns 216pa and 216pb disposed in the outer area of the backlight unit 200 or an area adjacent to the outer area can be disposed to have a smaller area.

In addition, in some cases, the light conversion patterns 216p can be arranged in such a different pattern that the distance between light emitting devices 211 or the number of the light emitting devices 211 can be different from each other in the central area and the outer area of the backlight unit 200.

Referring then to FIG. 14B, it is shown another example of the structure in which the light conversion patterns 216p are disposed on a bottom surface of the light conversion sheet 216.

Here, the distance between the light emitting devices 211 disposed in the outer area of the backlight unit 200 can be narrower than the distance between the light emitting devices 211 disposed in the central area of the backlight unit 200. In other words, those light emitting devices 211 can be arranged in a denser structure in the outer area of the backlight unit 200, so that the display device can present more uniform luminance in both the central area and the outer area of the backlight unit 200.

Further, as the light conversion patterns 216*p* disposed on the bottom surface of the light conversion sheet 216 are each arranged in a position corresponding to the light emitting device 211, the distance between the light conversion patterns 216*p* disposed in the outer area of the backlight unit 200 can be different from that between the light conversion patterns 216*p* disposed in its central area.

As an example, the distance D1 in a first direction of the light conversion patterns 216*p* disposed in the outer area of the backlight unit 200 can be smaller than the distance D2 in the first direction of the light conversion patterns 216*p* disposed in its central area. Likewise, the distance D3 in a second direction of the light conversion patterns 216*p* disposed in the outer area of the backlight unit 200 can be smaller than the distance D4 in the second direction of the light conversion patterns 216*p* disposed in its central area.

At this juncture, the size and thickness of the light conversion patterns 216*p* disposed in the outer area of the backlight unit 200 can be different from those of the light conversion pattern 216*p* disposed in the central area of the backlight unit 200.

For example, as illustrated in FIG. 14B, the size S1 of the light conversion patterns 216*pe* and 215*pf* disposed in the outer area of the backlight unit 200 can be smaller than the size S2 of the light conversion pattern 216*pg* disposed in the central area of the backlight unit 200.

Further, the light conversion patterns 216*p* can have a multi-layer structure as described above, wherein the thickness of the light conversion patterns 216*pe* and 216*pf* disposed in the outer area of the backlight unit 200 or the area of their thickest section can be smaller than the thickness of the light conversion pattern 216*pg* disposed in the central area of the backlight unit 200 or the area of its thickest section.

In other words, making smaller the size of the light conversion patterns 216*pe* and 216*pf* disposed in the outer area of the backlight unit 200 will enable the light conversion patterns to be arranged in line with the light emitting devices 211 arranged in a narrower distance. Thus, it makes it possible to prevent occurrence of a hot spot in the position corresponding to the light emitting device 211 in the outer area of the backlight unit 200.

Moreover, the light conversion pattern makes it possible to reduce a blocked level of the light emitted from the light emitting device 211 in the outer area of the backlight unit 200, thereby increasing the amount of light emission and preventing deterioration of the luminance in the outer area of the backlight unit 200, thus enabling to present more uniform luminance over an entire area of the backlight unit 200.

As described above, it is possible to prevent deterioration of the luminance in the outer area of the backlight unit 200, and improve the luminance uniformity, by arranging the structure of the light conversion pattern 216*p* in a differently patterned structure for each area of the backlight unit 200.

Furthermore, it is possible to prevent occurrence of hot spots in the backlight unit 200 and improve its luminance uniformity, using the aforementioned structure of arrangement of the light conversion patterns 216*p*.

According to the various embodiments of the present disclosure, it is also possible to provide a solution to improve the image quality of the backlight unit 200 and increase its light efficiency, by causing diffraction of the light emitted in the vertical direction of the light emitting device 211.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A backlight unit comprising:
   a light emitting section including a plurality of light emitting devices disposed on a substrate, and a light source protection layer disposed on the plurality of light emitting devices,
   wherein an air gap is disposed between a top surface of the substrate and a bottom surface of the light source protection layer and in between the plurality of light emitting devices;
   a light conversion sheet having a plurality of light conversion patterns, each of the plurality of light conversion patterns disposed in a position corresponding to one of the plurality of light emitting devices;
   a phosphor film disposed on the light conversion sheet; and
   at least one reflector including a plurality of holes on the substrate,
   wherein the air gap is disposed between a top surface of the at least one reflector and the bottom surface of the light source protection layer.

2. The backlight unit according to claim 1, wherein the light source protection layer includes:
   a first resin layer covering the plurality of light emitting devices, and
   a transparent film disposed on the first resin layer and the substrate.

3. The backlight unit according to claim 1, wherein the first resin layer is disposed in the hole, and a top surface of the first resin layer is positioned higher than the top surface of the at least one reflector.

4. The backlight unit according to claim 1, wherein the air gap is disposed on the top surface of the at least one reflector corresponding to a second area of the phosphor film.

5. The backlight unit according to claim 1, wherein the light source protection layer includes:
   a pattern with unevenness on a top surface or a bottom surface of the light source protection layer corresponding to a first area of the phosphor film.

6. The backlight unit according to claim 1, wherein the at least one reflector includes:
   a second resin layer disposed on the top surface of the at least one reflector corresponding to a first area out of the first area and a second area of the phosphor film.

7. The backlight unit according to claim 1, further comprising an optical sheet disposed on the phosphor film.

8. The backlight unit according to claim 1, wherein each of at least one of the plurality of light conversion patterns is configured to adjust an emitting direction of light emitted from a corresponding one of the plurality of light emitting devices.

9. The backlight unit according to claim 1, wherein each of at least one of the plurality of light conversion patterns has a central portion formed thickest.

10. A display device comprising:
  a display panel; and
  a backlight unit configured to provide light to the display panel, the backlight unit including:
  a light emitting section including a plurality of light emitting devices disposed on a substrate, and a light source protection layer disposed on the plurality of light emitting devices,
  wherein an air gap is disposed between a top surface of the substrate and a bottom surface of the light source protection layer and in between the plurality of light emitting devices;
  a light conversion sheet having a plurality of light conversion patterns disposed in positions corresponding to the plurality of light emitting devices;
  a phosphor film disposed on the light conversion sheet; and
  at least one reflector including a plurality of holes on the substrate,
  wherein the air gap is disposed between a top surface of the at least one reflector and the bottom surface of the light source protection layer.

11. The display device according to claim 10, wherein the light source protection layer includes:
  a first resin layer covering the plurality of light emitting devices, and
  a transparent film disposed on the first resin layer and the substrate.

12. The display device according to claim 10, wherein the first resin layer is disposed in the hole, and a top surface of the first resin layer is positioned higher than the top surface of the at least one reflector.

13. The display device according to claim 10, wherein the air gap is disposed on the top surface of the at least one reflector corresponding to a second area out of a first area and the second area of the phosphor film.

14. The display device according to claim 10, wherein the light source protection layer includes:
  a pattern with unevenness on a top surface or a bottom surface of the light source protection layer corresponding to a first area of the phosphor film.

15. The display device according to claim 10, wherein the at least one reflector includes:
  a second resin layer disposed on the top surface of the at least one reflector corresponding to a first area of the phosphor film.

16. The display device according to claim 10, further comprising an optical sheet disposed on the phosphor film.

17. The display device according to claim 10, wherein each of at least one of the plurality of light conversion patterns is configured to adjust an emitting direction of light emitted from a corresponding one of the plurality of light emitting devices.

18. The display device according to claim 10, wherein each of at least one of the plurality of light conversion patterns has a central portion formed thickest.

19. A backlight unit comprising:
  a light emitting section including a plurality of light emitting devices disposed on a substrate, and a light source protection layer disposed on the plurality of light emitting devices,
  wherein an air gap is disposed between a top surface of the substrate and a bottom surface of the light source protection layer and in between the plurality of light emitting devices;
  a light conversion sheet having a plurality of light conversion patterns, each of the plurality of light conversion patterns disposed in a position corresponding to one of the plurality of light emitting devices; and
  a phosphor film disposed on the light conversion sheet,
  wherein the air gap does not overlap the plurality of light emitting devices.

* * * * *